July 31, 1962
E. LAIMINS
3,046,788
FLUID PRESSURE ELECTRICAL TRANSDUCER
Filed Aug. 4, 1960
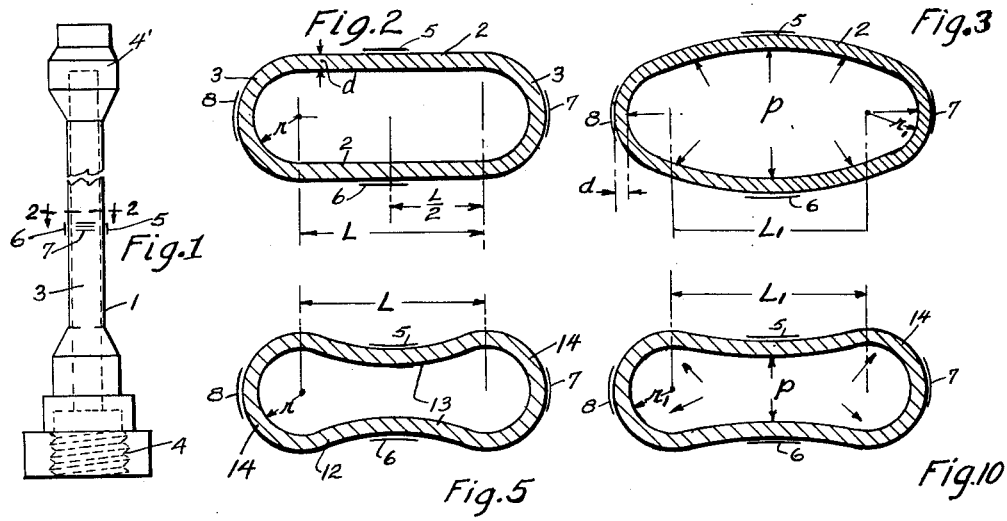
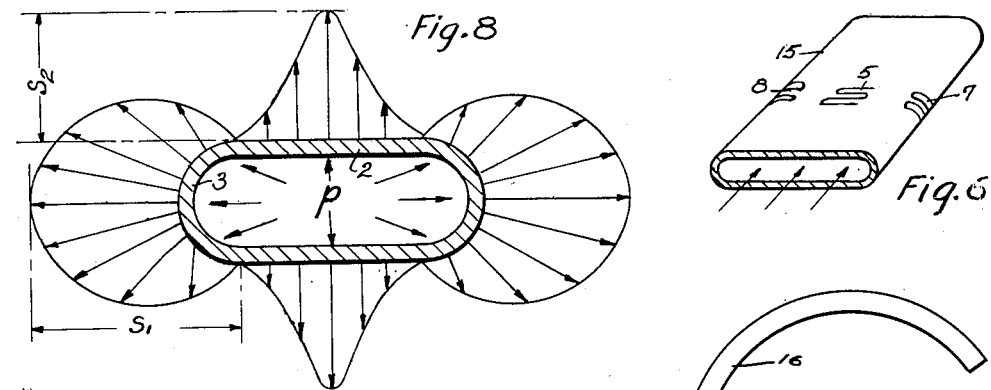
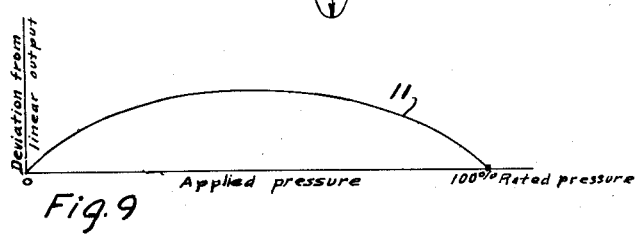
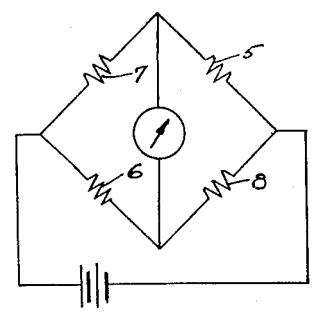
INVENTOR
Eric Laimins
BY
ATTORNEY United States Patent Office 3,046,788
Patented July 31, 1962

3,046,788
FLUID PRESSURE ELECTRICAL TRANSDUCER
Eric Laimins, Cambridge, Mass., assignor to Baldwin-Lima-Hamilton Corporation, a corporation of Pennsylvania
Filed Aug. 4, 1960, Ser. No. 47,411
2 Claims. (Cl. 73—398)

This invention relates to fluid pressure measuring devices of the type employing bonded filament strain gages of the electrical resistance type whose change in resistance is in proportion to strain induced in a flexible wall by the pressure.

Various types of fluid pressure measuring devices employing bonded electrical strain gage sensing elements of the type disclosed in Patent No. 2,292,549 have been used or proposed but they have been deficient in certain respects. Substantially flattened tubes of either the Bourdon type, or tubes that extend in a straight line, have heretofore been gaged on their substantially flattened sides and on their curved edges but such arrangements have not been fully effective. The term "tube" herein broadly includes flattened vessels whose cross-sectional shape is generally similar to the "key-hole" form disclosed herein.

It is an object of my invention to provide an improved tubular type fluid pressure measuring device employing bonded filament strain gages of the electrical resistance type so as to obtain in a relatively simple construction a high degree of electrical output in response to fluid pressure and to accomplish this with a desired degree of linearity of output versus change of pressure, together with minimum hysteresis and a high degree of stability and accuracy.

Other objects and advantages will be more apparent to those skilled in the art from the following description of the accompanying drawings in which:

FIG. 1 is a side elevation of a flattened type of fluid pressure measuring device;

FIG. 2 is an enlarged cross-sectional view taken substantially on the line 2—2, FIG. 1 but turned 90° thereto, no pressure being in the tube;

FIG. 3 is a cross-sectional view similar to FIG. 2 but with the tube shown in greatly magnified form when under pressure;

FIG. 4 is a side elevation of a Bourdon tube;

FIG. 5 is a view showing the cross-sectional configuration of an unpressurized tubular member of "keyhole" formation so as to obtain maximum linearity;

FIG. 6 is a fragmentary perspective of any flattened tubular vessel;

FIG. 7 is a Wheatstone bridge showing the manner of positioning the gages therein;

FIG. 8 is a vector diagram showing generally the stress distribution of the tubes and the manner in which I utilize the same in accomplishing my improved results;

FIG. 9 is a curve showing deviation from linear output for a tube with flat sides; and FIG. 10 is a cross-sectional view of the FIG. 5 keyhole configuration when under pressure.

I have shown in FIG. 1 a straight tube 1 which in cross-section, FIG. 2, has generally flattened sides 2 and curved ends 3, the wall thickness 3 being preferably uniform. Fluid pressure is admitted to the tube through any suitable connection 4 at the lower end while the upper end 4′ is closed. In accordance with my disclosure the thickness of the wall may be such as to provide a desired magnitude of stress for obtaining the necessary degree of sensitivity and pressure capacity. Filament type strain gages 5 and 6 of the type shown in said Patent No. 2,292,549 are bonded throughout their effective length substantially symmetrically on the substantially flattened and parallel external surface of wall portions of the tube and similar gages 7 and 8 are symmetrically bonded on the external surface of curved ends 3 which are parts of substantially an annulus. The length of the filaments extend in a circumferential direction with respect to the axes of the tube when viewed in cross-section as in FIG. 2. When the tube is subjected to pressure the gages 5 and 6 will be in tension and the gages 7 and 8 in compression. The gages 5 and 6 will be disposed in opposite arms of a Wheatstone bridge as shown in FIG. 7 and the gages 7 and 8 in the other opposite arms.

The controlling principles which are present in my improved device are as follows: If pressure is admitted inside a flattened tube-type pressure vessel, flexure of its walls will occur, in contrast to a round tube where stresses other than flexure (bending) occur at all points in the wall. The distribution of the flexure strains in a flattened tube will always have a certain pattern with peaks always occurring at certain portions of the wall, such as at the minor and major axes of the tube section. The relative magnitude of these peaks can be changed at will by varying the tube design parameters or their ratios in accordance with the principles hereof. Certain parameters of importance are shown in FIG. 2 in which:

$L$ = Length of the flat portion, i.e., the distance between the focal points (center of radii) of the curved ends 3 or 14;
$r$ = Inside radius of the curved end portions;
$d$ = Wall thickness;
$r/d$ = Dimensionless form factor;
$L/d$ = Dimensionless slenderness factor.

I have determined that if a flattened tube of above form is subject to internal pressure, the flexure stresses at the outside surface of the tube will have distribution approximately as shown in FIG. 8 where:

$S_1$ = Flexure stress at the outside surface of the curved portion; and
$S_2$ = Flexure stress at the outside surface of the flat portion.

By varying the ratios $r/d$ and $L/d$ I can control the relative magnitudes of $S_1$ and $S_2$ arriving at the most efficient design in giving the highest output for a maximum stress. This is the case if $S_1 = -S_2$.

FIGS. 2 and 3 show the effect of internal pressure upon the parameters "$L$" and "$r$," as well as on the ratios $r/d$ and $L/d$. It can be demonstrated mathematically and I have proved it experimentally, that upon occurrence of internal pressure in FIG. 3 "$L_1$" is less than "$L$," and "$r_1$" is greater than "$r$." These changes in "$L$" and "$r$" will have an effect upon the relationship of pressure vs. strain and, consequently, if four strain gages are applied to the outside surface of the tube to measure strains where they are maximum, as shown in FIG. 2, the changes will have an effect upon the electrical output from the strain gages vs. applied pressure.

The above effect will cause some non-linearity in the bridge output as a function of the applied pressure, mainly because the internal pressure tends to decrease parameter "$L$." Consequently, the ratio of output vs. applied pressure will decrease with increasing pressure, and the terminal linearity curve 11 will be approximately as shown in FIG. 9.

I have found that by changing the tube section from that as shown in FIG. 2 to that of FIG. 5 which I call a "keyhole" form 12, I can minimize the effect of change in parameter "$L$" on the bridge output linearity. The "keyhole" form is a modified flattened tube which, in its initial state, i.e., unpressurized, has concave wall portions 13 connected by ends 14 forming part of an annulus. The effect that internal pressure will have on the parameters "$L$" and "$r$" for a tube of such cross-section can be seen by considering FIGS. 5 and 10. The "keyhole" tube is gaged in the manner of FIG. 2 and accordingly the gages are given the same reference numbers.

It is evident from FIGS. 5 and 10 that "L" is smaller than "$L_1$," and "$r_1$" is greater than "$r$." Thus, I am able now to control the change in "L" and, consequently, decrease the maximum deviation from linear output shown in FIG. 9. The decrease in such maximum deviation is obtained because the pressure will first expand the concave surfaces into a flat shape thus increasing the length L, while further increase of such pressure will inherently expand the flattened surfaces into a convex shape thus decreasing the length L. The deviation from a linear output line is thus divided, for a given maximum pressure, on each side of such line, first on one side thereof by the straightening of the concave surfaces and then on the other side by expanding the surfaces into convex form. These successive deviations are of less magnitude than would be the case were the tube initially flat as in FIG. 2. With an initially flat tube the entire deviation occurs on only one side of a linear output line as illustrated in FIG. 9. The average output of the gages thus more nearly approaches a linear output over the full pressure range. It should be understood that these deviations are relatively small quantities usually in the order of ½% of full scale bridge output, but they can be higher for certain "$r/d$" and "$L/d$" ratios.

If an unpressurized tube has an initial oval cross-section (similar in shape to the pressurized tube of FIG. 3) such as is sometimes used in Bourdon tubes the oval configuration will be less effective than if the initial section had sides that are substantially flat, but still such oval section will be greatly improved if gaged in the manner shown in FIG. 2.

It is seen from the disclosure hereof that I have provided a tubular vessel of particular cross-sectional form having strain gages applied in the specific pattern disclosed herein, regardless of the third dimension of the tube, that is its length. I have shown that a pressure vessel, having this generally flattened tube cross-section, can be straight as shown at 1, FIG. 1, or at 15, FIG. 6, or curved in its third dimension in the form of a Bourdon tube 16, FIG. 4, without affecting the principles of my invention.

From the foregoing disclosure it is seen that I have provided a fluid pressure measuring device of tubular form with a "key-hole" cross-sectional configuration that has a high degree of electrical output in response to fluid pressure and accomplishes this will other favorable characteristics combined with a high degree of simplicity of construction.

It will, of course, be understood that various changes in details of construction and arrangement of parts may be made by those skilled in the art without departing from the spirit of the invention as set forth in the appended claims.

I claim:
1. A fluid pressure electrical transducer comprising a hollow fluid pressure member containing a cross-sectional portion with opposed walls of initial concave shape connected by partial-annulus end walls, the external surface of the concave walls being subject to bending strains in tension and the external surfaces of the partial-annular walls being subject to bending strains in compression in response to internal pressure, whereby the distance between the focal points of the partial-annular surfaces increases as the tube expands to change the concave wall to a flat surface and decreases after the tube is expanded past a flat condition into a convex shape, and electrical resistance filament type strain gages bonded throughout their effective length to the external surfaces of the concave portions of said walls so as to be responsive to said tension bending strains and whose electrical outputs will deviate successively on opposite sides of a linear output line as the tube changes from concave to convex thereby to obtain an average output approaching the linear line.

2. The combination set forth in claim 1 further characterized in that electrical resistance filament type strain gages are bonded throughout their effective length to the external surface of the partial-annular portions of said walls so as to be responsive to the compression bending strains therein, and the strain gages on the partial-annular portions and on the concave portions being electrically connected together so as to be additive in their outputs.

References Cited in the file of this patent
UNITED STATES PATENTS

| | | |
|---|---|---|
| 2,420,148 | Ostergren | May 6, 1947 |
| 2,872,812 | Jones et al. | Feb. 10, 1958 |

FOREIGN PATENTS

| | | |
|---|---|---|
| 757,597 | Great Britain | Sept. 19, 1956 |